US007599888B2

(12) United States Patent
Manfre et al.

(10) Patent No.: US 7,599,888 B2
(45) Date of Patent: Oct. 6, 2009

(54) ELECTRONIC CONFIRMATION TO DEBIT OR CREDIT AN ACCOUNT

(75) Inventors: Mario P. Manfre, Katy, TX (US); Christopher A. Schmid, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 1335 days.

(21) Appl. No.: 09/992,596

(22) Filed: Nov. 14, 2001

(65) Prior Publication Data

US 2003/0093368 A1 May 15, 2003

(51) Int. Cl.
*G06Q 40/00* (2006.01)
(52) U.S. Cl. .......................................... 705/44; 705/45
(58) Field of Classification Search .................... 705/44, 705/45
See application file for complete search history.

(56) References Cited

U.S. PATENT DOCUMENTS

| | | | | |
|---|---|---|---|---|
| 5,053,607 | A * | 10/1991 | Carlson et al. ................. | 705/18 |
| 5,650,604 | A | 7/1997 | Marcous et al. | |
| 5,679,938 | A * | 10/1997 | Templeton et al. .......... | 235/379 |
| 5,679,940 | A * | 10/1997 | Templeton et al. .......... | 235/380 |
| 6,282,523 | B1 * | 8/2001 | Tedesco et al. ................ | 705/45 |
| 6,560,581 | B1 * | 5/2003 | Fox et al. ....................... | 705/51 |
| 6,647,376 | B1 * | 11/2003 | Farrar et al. .................... | 705/45 |
| 6,661,910 | B2 * | 12/2003 | Jones et al. ................. | 382/135 |
| 6,728,397 | B2 * | 4/2004 | McNeal ...................... | 382/137 |
| 6,757,664 | B1 * | 6/2004 | Cardinal et al. ............... | 705/38 |
| 6,786,398 | B1 * | 9/2004 | Stinson et al. .............. | 235/379 |
| 6,856,965 | B1 * | 2/2005 | Stinson et al. ................ | 705/21 |
| 7,181,430 | B1 * | 2/2007 | Buchanan et al. ............. | 705/45 |
| 2001/0032183 | A1 * | 10/2001 | Landry ........................ | 705/40 |
| 2001/0037299 | A1 * | 11/2001 | Nichols et al. ................ | 705/42 |
| 2001/0044764 | A1 * | 11/2001 | Arnold ........................ | 705/35 |
| 2002/0062286 | A1 * | 5/2002 | Tedesco et al. ................ | 705/45 |
| 2002/0087463 | A1 * | 7/2002 | Fitzgerald et al. ............. | 705/39 |
| 2002/0103756 | A1 * | 8/2002 | Andrews et al. ............... | 705/42 |
| 2002/0152166 | A1 * | 10/2002 | Dutta et al. .................... | 705/43 |
| 2002/0152169 | A1 * | 10/2002 | Dutta et al. .................... | 705/45 |
| 2002/0152170 | A1 * | 10/2002 | Dutta et al. .................... | 705/45 |
| 2002/0154164 | A1 * | 10/2002 | Clapper ...................... | 345/752 |
| 2002/0169720 | A1 * | 11/2002 | Wilson et al. ................. | 705/44 |
| 2002/0174074 | A1 * | 11/2002 | Meadow et al. ............... | 705/71 |
| 2002/0178112 | A1 * | 11/2002 | Goeller et al. ................ | 705/39 |

(Continued)

OTHER PUBLICATIONS

International Search Report for PCT/US02/36618 dated Feb. 28, 2005.

(Continued)

*Primary Examiner*—Jagdish N Patel
*Assistant Examiner*—Sara Chandler
(74) *Attorney, Agent, or Firm*—Sutherland Asbill & Brennan LLP

(57) ABSTRACT

A method for processing a check transaction includes receiving transaction information that is transmitted by a terminal; determining eligibility of the transaction for payment via a bank account; providing an electronic authorization response that is transmitted to the terminal, the authorization response including a unique transaction identifier if the transaction is eligible for payment via the bank account; and receiving an electronic response packet that is transmitted by the terminal if the transaction is eligible for payment via the bank account, the response packet including the unique transaction identifier and a transaction decision regarding payment via the bank account.

17 Claims, 2 Drawing Sheets

U.S. PATENT DOCUMENTS

| | | | |
|---|---|---|---|
| 2003/0033252 A1* | 2/2003 | Buttridge et al. | 705/45 |
| 2003/0050889 A1* | 3/2003 | Burke | 705/40 |
| 2003/0050892 A1* | 3/2003 | Clynes et al. | 705/45 |
| 2003/0069941 A1* | 4/2003 | Peiffer | 709/217 |
| 2003/0088514 A1* | 5/2003 | Sesek | 705/43 |
| 2004/0158522 A1* | 8/2004 | Brown et al. | 705/40 |

OTHER PUBLICATIONS http://news.firstdata.com, TeleCheck Provides Worldsite With Internet Check and Recurring Payment Services, Jan. 20, 2000.

* cited by examiner

ELECTRONIC CONFIRMATION TO DEBIT OR CREDIT AN ACCOUNT

BACKGROUND OF THE INVENTION

1. Field of the Invention

The invention relates to a method for processing a transaction that involves debiting or crediting a bank account.

2. Background Art

A prior method of paying for goods and/or services includes writing a check drawn against a checking account. It is also known to pay for goods and/or services by providing a checking account number to a merchant so that the merchant can initiate electronic transfer of funds from the checking account. Such transactions involving a check and/or a bank account, such as a checking account, may be referred to as check transactions. A known method for processing a check transaction includes entering transaction information, such as dollar amount of the transaction, check number and bank numbers, into a point of sale terminal. The terminal then communicates with an authorization source to obtain authorization for the check transaction. Once the transaction is authorized, the terminal captures or otherwise stores the transaction information. The transaction information is then uploaded to the host computer in batches and at certain time periods, such as at the end of each day, for settlement purposes.

If the authorization response sent by the host is not received by the merchant for whatever reason, such as failed communication link, the merchant will not know whether the transaction was successfully processed. As a result, the merchant may resubmit the transaction to the host computer. If the original transaction and subsequent transaction are both processed, the checking account may be debited twice.

Furthermore, under the above method, the merchant will not know whether the terminal accurately captured the transaction information. The merchant may also not know if the terminal accurately transmitted the transaction information to the host computer.

SUMMARY OF THE INVENTION

The invention addresses the shortcomings of the prior art by providing an improved method and system for processing check transactions. Advantageously, the method and system involve obtaining electronic confirmation to debit bank accounts so that multiple debits for the same transaction may be reduced or eliminated.

Under the invention, a method for processing a check transaction includes receiving transaction information that is transmitted by a terminal; determining eligibility of the transaction for payment via a bank account; providing an electronic authorization response that is transmitted to the terminal, the authorization response including a unique transaction identifier if the transaction is eligible for payment via the bank account; and receiving an electronic response packet that is transmitted by the terminal if the transaction is eligible for payment via the bank account, the response packet including the unique transaction identifier and a transaction decision regarding payment via the bank account.

The transaction identifier may be a numeric identifier that is used to uniquely identify the check transaction on an authorization source computer system, for example. The transaction identifier may, however, comprise one or more numbers, letters, symbols and/or images.

The method may further include storing the authorization response in an authorization response file, storing the response packet in a response packet file, and comparing the response packet file with the authorization response file prior to settling the transaction.

Further under the invention, a method of processing a check transaction includes providing transaction information to an authorization source using a terminal so as to determine eligibility of the transaction for payment via a bank account; receiving at the terminal an electronic authorization response provided by the authorization source, the authorization response including a unique transaction identifier if the transaction is eligible for payment via the bank account; and providing an electronic response packet to the authorization source using the terminal if the transaction is eligible for payment via the bank account, the response packet including the unique transaction identifier and a transaction decision regarding payment via the bank account.

A computer system according to the invention for processing a check transaction initiated by a terminal includes instructions for determining eligibility of the transaction for payment via a bank account; instructions for generating an electronic authorization response that is communicated to the terminal, the authorization response including a unique transaction identifier if the transaction is eligible for payment via the bank account; and instructions for receiving an electronic response packet provided by the terminal if the transaction is eligible for payment via the bank account, the response packet including the unique transaction identifier and a transaction decision regarding payment via the bank account.

Further under the invention, a system for processing a check transaction includes a terminal for transmitting transaction information associated with the transaction, and an authorization source computer system in communication with the terminal and operative to receive the transaction information from the terminal. The authorization source computer system includes instructions for determining eligibility of the transaction for payment via a bank account, and instructions for generating an electronic authorization response for transmission to the terminal. The authorization response includes a unique transaction identifier if the transaction is eligible for payment via the bank account. Furthermore, the terminal is operative to receive the authorization response from the authorization source computer system and to transmit an electronic response packet to the authorization source computer system if the transaction is eligible for payment via the bank account. The response packet includes the unique transaction identifier and a transaction decision regarding payment via the bank account.

These and other objects, features and advantages of the invention are readily apparent from the following detailed description of the preferred embodiments for carrying out the invention when taken in conjunction with the accompanying drawings.

DETAILED DESCRIPTION OF THE PREFERRED EMBODIMENT(S)

Figure 1:
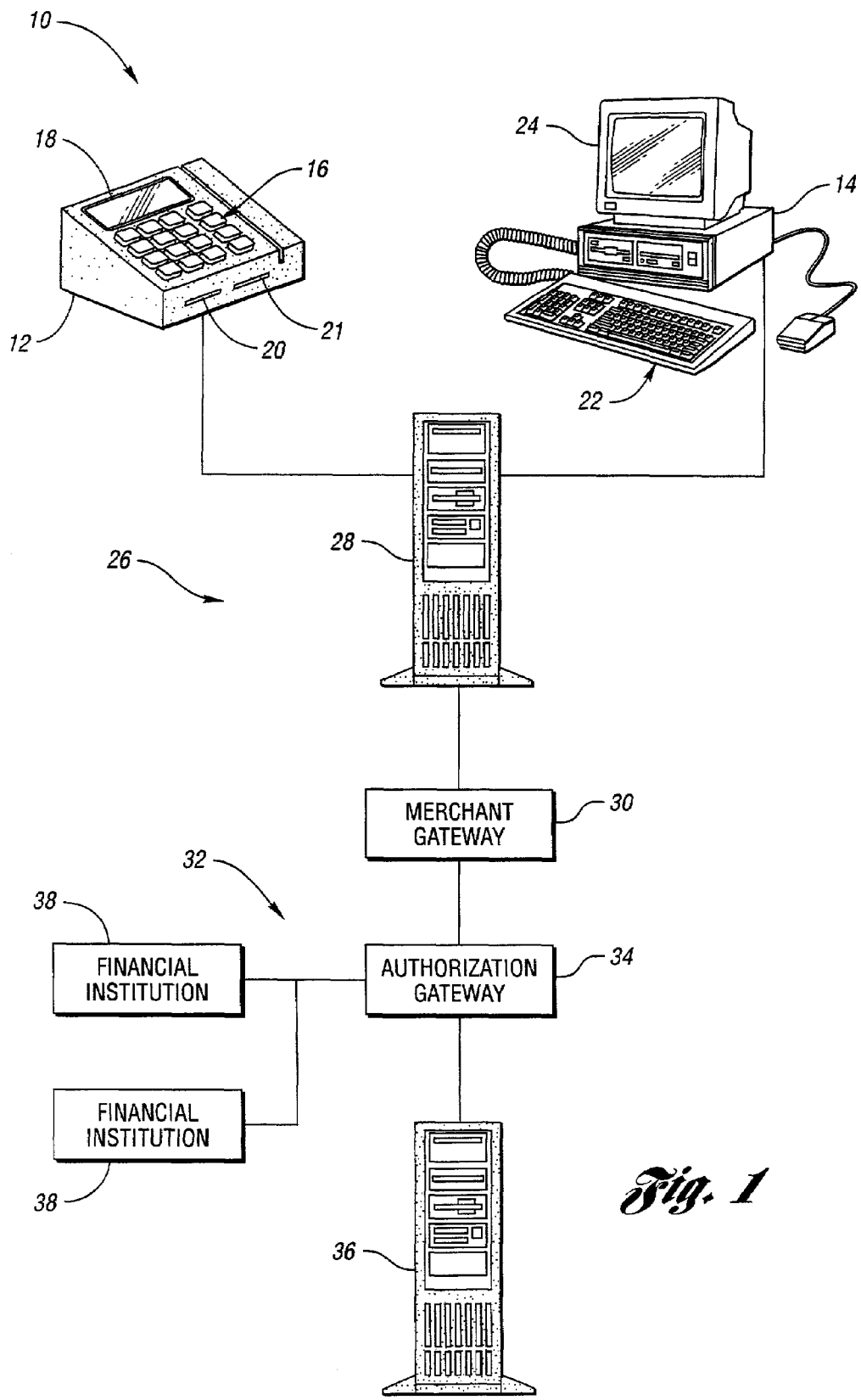
FIG. 1 is a schematic view of a system according to the invention for processing check transactions.

FIG. 1 shows a system 10 for processing check transactions according to the invention. The term "check transaction" as used herein refers to a transaction involving the purchase or sale of goods and/or services, for which a check and/or a bank account, such as a savings account or a checking account, is used as the method of payment. Suitable types of checks include, for example, personal checks, traveler's checks, credit card checks, and other corporate checks. Similarly, suitable bank accounts include personal bank accounts and corporate bank accounts.

The system 10 includes one or more transaction initiating terminals, such as a point of sale (POS) terminal 12 and a personal computer 14. The POS terminal 12 may include a key pad 16, a display device 18, an imaging device 20 for creating electronic images of checks, and/or a check reader 21 for electronically reading information from checks. In one embodiment of the invention, the POS terminal 12 is an Eclipse® terminal available from (Corporation) of (City and State). Similarly, the computer 14 includes a key pad 22 and a display device 24. The computer 14 may also include an imaging device (not shown) and/or a check reader (not shown) that are similar to the imaging device 20 and check reader 21.

The POS terminal 12 is preferably owned and/or operated by a merchant engaged in the business of selling goods and/or services. The computer 14 may also be owned and/or operated by the merchant. Alternatively, the computer 14 may be owned and/or operated by a customer attempting to purchase goods and/or services from the merchant.

The initiating terminals 12 and 14 are in communication with a merchant computer system 26 via any suitable communication system or network, such as a local area network, a wide area network, a dial-up network, the Internet, a wireless network or any combination thereof. While the merchant computer system 26 may include one or more computers, in the embodiment shown in FIG. 1, for example, the merchant computer system 26 includes a merchant host 28 in communication with a merchant gateway 30.

The merchant gateway 30 includes hardware and/or software necessary for transmitting information between the merchant host 28 and another computer or electronic device. When transmitting information to the merchant host 28, the merchant gateway 30 may also translate the information into a suitable language recognizable by the merchant host 28.

The merchant computer system 26 is in communication, via any suitable communication system or network, with an authorization source computer system 32 of an authorization source for obtaining authorization of check transactions. While the authorization source computer system 32 may include one or more computers, in the embodiment shown in FIG. 1, the authorization source computer system 32 includes an authorization gateway 34 in communication with an authorization host 36. The authorization gateway 34 includes hardware and/or software necessary for transmitting information between the authorization host 36 and another computer or electronic device, such as the merchant host 28. When transmitting information to the authorization host 36, the authorization gateway 34 may also translate the information into a suitable language recognizable by the authorization host 36.

The authorization source computer system 32 may be in communication, via any suitable communication system or network, with one or more financial institutions 38 so as to obtain bank account information or other information.

In an alternative embodiment of the system 10, the initiating terminals 12 and 14 may be linked directly with the authorization gateway 34 and/or authorization host 36 via any suitable communication system or network, such as described above in detail. With such a configuration, the initiating terminals 12 and 14 may communicate directly with the authorization gateway 34 and/or authorization host 36.

Figure 2:
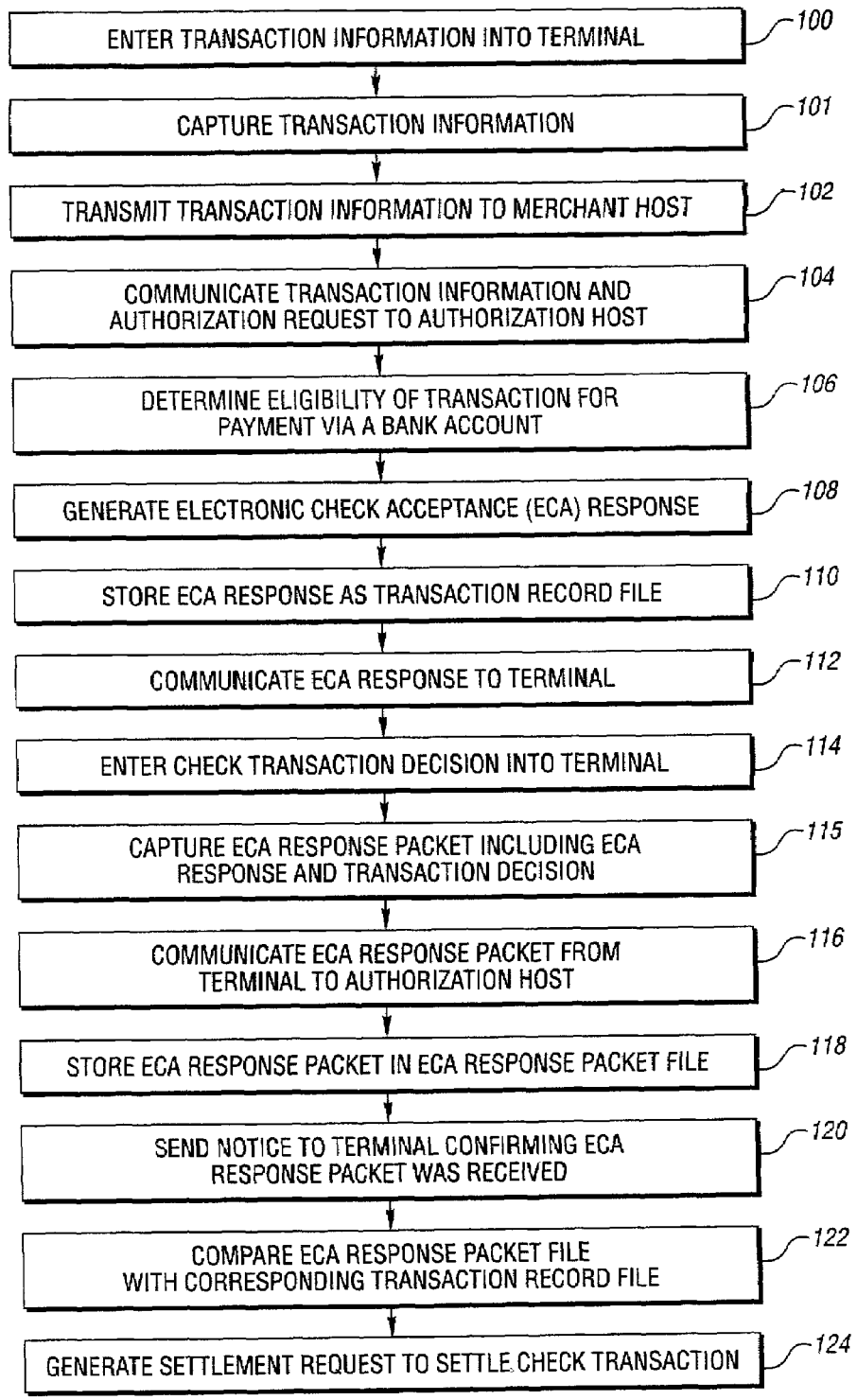
FIG. 2 is a flow chart illustrating steps of a method according to the invention for processing check transactions.

FIG. 2 is a flow chart illustrating operation of a method or system, such as system 10, for processing a check transaction according to the invention. As will be appreciated by one of ordinary skill in the art, many of the steps in FIG. 2 represent control logic which may be affected or implemented by hardware, software, or a combination of hardware and software.

At step 100 of FIG. 2, transaction information may be entered into the POS terminal 12, such as by using the key pad 16. The transaction information may include, for example, customer information such as customer name, check number of a check to be used as payment, and one or more bank numbers associated with the check. Such bank numbers may include, for example, an account number associated with the check, such as a checking account number and/or savings account number, a routing number of financial institution 38, or other financial institution associated with the check. The transaction information may also include additional information such as dollar amount of the transaction, store code of the merchant, a merchant identifier associated with the merchant, etc. Alternatively or supplementally, the imaging device 20 and/or check reader 21 may be used to enter transaction information associated with the check into the POS terminal 12.

Next, the transaction information is captured or otherwise stored on the POS terminal 12 at step 101. The transaction information is then transmitted or otherwise communicated from the POS terminal 12 to the merchant host 28, at step 102. In addition to or as an alternative to storing the transaction information on the POS terminal 12, the transaction information may be captured or otherwise stored on the merchant host 28. At step 104, the transaction information and an authorization request are communicated from the merchant host 28 through the gateways 30 and 34 to the authorization host 36. Alternatively, the transaction information and authorization request may be transmitted or otherwise communicated from the POS terminal 12 directly to the authorization gateway 34 and/or authorization host 36.

At step 106, the authorization host 36 determines eligibility of the transaction for payment via a bank account associated with the check, such as a checking account and/or savings account. For example, the authorization host 36 may determine eligibility based on bank account rules developed by the authorization host 36 and/or provided by the financial institution 38. As another example, the authorization host 36 may communicate with the financial institution 38 to determine if sufficient funds exist in the bank account.

Next, at step 108, the authorization host 36 generates an electronic authorization response, such as an electronic check acceptance (ECA) response. The ECA response preferably, but not necessarily, includes some or all of the transaction information, as well as a transaction identifier if the transaction is eligible for payment via the bank account. The transaction identifier may be a numeric identifier that is used to uniquely identify the check transaction on the authorization host 36, or elsewhere. The transaction identifier may, however, comprise one or more numbers, letters, symbols and/or images. The ECA response may also include a confirmation request message, for requesting that the merchant confirm whether or not the customer wishes to proceed with payment via the bank account.

Next, at step 110, the authorization host 36 stores the ECA response. For example, the ECA response may be stored as an authorization response file or transaction record file. At step 112, the authorization host 36 communicates or otherwise provides the ECA response to the POS terminal 12 through the gateways 34 and 30 and merchant host 28. Alternatively, the authorization host 36 or authorization gateway 34 may communicate or otherwise provide the ECA response directly to the POS terminal 12.

When the POS terminal 12 receives the ECA response, the ECA response may be displayed on the display device 18. For example, the display device 18 may display the following message: "Transaction approved; transaction identifier is 0123. Does customer want ECA?" At step 114, the merchant enters a check transaction decision into the POS terminal 12 that indicates whether or not the customer wishes to proceed with the check transaction. The POS terminal 12 combines this decision with the ECA response to form an ECA response packet. Thus, the ECA response packet includes the transaction identifier as well as the customer's decision regarding the check transaction. If the customer decides to proceed with the check transaction, then the ECA response packet may be referred to as an electronic confirmation to debit the customer's bank account.

At step 115, the POS terminal 12 captures or otherwise stores the ECA response packet. Next, at step 116, the ECA response packet is communicated from the POS terminal 12, through the merchant host 28 and gateways 30 and 34, to the authorization host 36. Alternatively, the ECA response packet may be communicated from the POS terminal 12 directly to the authorization gateway 34 and/or authorization host 36. The authorization host 36 then stores the ECA response packet in an ECA response packet file, at step 118. At step 120, the authorization host 36 may also send a notice to the POS terminal 12 and/or merchant host 28 confirming that the ECA response packet was received. Such a notice may be referred to as an electronic confirmation of receipt of the ECA response packet.

Next, at step 122, the authorization host 36 compares the ECA response packet file with the corresponding transaction record file. If the transaction identifier and/or other transaction information in the ECA response packet file does not match the transaction identifier and/or other transaction information in the corresponding transaction record file, then the authorization host 36 may terminate the check transaction and return an error message to the POS terminal 12. Such an error message may be communicated directly to the POS terminal 12, or routed through the gateways 34 and 30 and merchant host 28. If, on the other hand, the transaction identifier and/or other transaction information in the ECA response packet file matches the transaction identifier and/or other transaction information in the corresponding transaction record file, then the check transaction is ready for settlement.

Settlement includes a first settlement process between the authorization source, which functions as an acquirer, and the merchant. Settlement also includes a second settlement process between the authorization source and the financial institution 38 associated with the bank account.

Settlement of the check transaction may occur in any suitable manner. For example, at step 124, the POS terminal 12 or the merchant host 28 may generate a settlement request to settle the check transaction. Preferably, the settlement request is transmitted concurrently with the ECA response packet so that the check transaction may be settled immediately between the authorization source and the merchant. As another example, the POS terminal 12 or the merchant host 28 may submit, at a predetermined time, a batch of transactions for settlement. As yet another example, the authorization host 36 may determine when to settle the transaction or batch of transactions.

Because the method of the invention involves utilizing an ECA response packet, the method provides a safeguard against multiple debiting of a bank account for the same check transaction. Furthermore, because the ECA response, sent directly or indirectly from the authorization host 36 to the POS terminal 12, may include some or all of the transaction information originally entered into the POS terminal 12, the merchant will be able to confirm whether or not the POS terminal 12 accurately stored and transmitted the transaction information.

The method of the invention may also include a similar process for crediting a bank account, such as a checking account or a savings account. For example, credit transaction information associated with a credit transaction may be entered into the POS terminal 12, such as by using the key pad 16. The credit transaction information may include, for example, customer information such as customer name and bank account number. The credit transaction information may also include additional information such as store code and merchant identifier.

Next, the credit transaction information is captured or otherwise stored on the POS terminal 12. The credit transaction information is then transmitted from the POS terminal 12 to the merchant host 28. The credit transaction information may also be captured or otherwise stored on the merchant host 28. The credit transaction information and a credit authorization request are then communicated from the merchant host 28 through the gateways 30 and 34 to the authorization host 36. Alternatively, the credit transaction information and credit authorization request may be transmitted or otherwise communicated from the POS terminal 12 directly to the authorization gateway 34 and/or authorization host 36.

In response to the credit authorization request, the authorization host 36 may confirm that the bank account is active and eligible for an electronic credit. The authorization host 36 may then generate an electronic authorization response, such as an electronic bank account credit (EBAC) response. The EBAC response preferably, but not necessarily, includes some or all of the credit transaction information, as well as a credit transaction identifier if the bank account is eligible for an electronic credit. The credit transaction identifier may be a numeric identifier that is used to uniquely identify the credit transaction on the authorization host 36, or elsewhere. The credit transaction identifier may, however, comprise one or more numbers, letters, symbols and/or images. The EBAC response may also include a confirmation request message for requesting that the merchant confirm whether or not the customer wishes to proceed with the credit transaction.

Next, the authorization host 36 stores the EBAC response. For example, the EBAC response may be stored as a credit authorization response file or transaction record file. The authorization host 36 then communicates or otherwise provides the EBAC response to the POS terminal 12 through the gateways 34 and 30 and merchant host 28. Alternatively, the authorization host 36 or authorization gateway 34 may communicate or otherwise provide the EBAC response directly to the POS terminal 12.

When the POS terminal 12 receives the EBAC response, the EBAC response may be displayed on the display device 18. For example, the display device 18 may display the following message: "Credit transaction approved; transaction identifier is 0456. Does customer want to proceed with credit?" The merchant then enters a credit transaction decision into the POS terminal 12 that indicates whether or not the customer wishes to proceed with the credit transaction. The POS terminal 12 combines this decision with the EBAC response to form an EBAC response packet. Thus, the EBAC response packet includes the credit transaction identifier as well as the customer's decision regarding the credit transaction. If the customer decides to proceed with the credit transaction, then the EBAC response packet may be referred to as an electronic confirmation to credit the customer's bank account.

Next, the POS terminal 12 captures or otherwise stores the EBAC response packet. The EBAC response packet is then communicated from the POS terminal 12, through the merchant host 28 and gateways 30 and 34, to the authorization host 36 Alternatively, the EBAC response packet may be communicated from the POS terminal 12 directly to the authorization gateway 34 and/or authorization host 36. The authorization host 36 then stores the EBAC response packet in an EBAC response packet file. The authorization host 36 may also send a notice to the POS terminal 12 and/or merchant host 28 confirming that the EBAC response packet was received. Such a notice may be referred to as an electronic confirmation of receipt of the EBAC response packet.

Next, the authorization host 36 compares the EBAC response packet file with the corresponding transaction record file. If the credit transaction identifier and/or other credit transaction information in the EBAC response packet file does not match the credit transaction identifier and/or other credit transaction information in the corresponding transaction record file, then the authorization host 36 may terminate the credit transaction and return an error message to the POS terminal 12. Such an error message may be communicated directly to the POS terminal 12, or routed through the gateways 34 and 30 and merchant host 28. If, on the other hand, the credit transaction identifier and/or other credit transaction information in the EBAC response packet file matches the credit transaction identifier and/or other credit transaction information in the corresponding transaction record file, then the credit transaction is ready for settlement.

Settlement includes a first settlement process between the authorization source and the merchant. Settlement also includes a second settlement process between the authorization source and the financial institution 38 associated with the bank account.

Settlement of the credit transaction may occur in any suitable manner. For example, the POS terminal 12 or the merchant host 28 may generate a settlement request to settle the credit transaction. The settlement request may be transmitted concurrently with the EBAC response packet so that the credit transaction may be settled immediately between the authorization source and the merchant. As another example, the POS terminal 12 or the merchant host 28 may submit, at a predetermined time, a batch of credit transactions for settlement. As yet another example, the authorization host 36 may determine when to settle the credit transaction or batch of credit transactions.

Advantageously, the method of the invention may also be practiced over the Internet. In such a case, the computer 14 may be utilized by a customer to access a web site of a merchant. The computer 14 may then be used to perform the method steps of the POS terminal 12 described above in detail.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer-implemented method for processing a check transaction, the method comprising:

receiving, by one or more processors, transaction information associated with the check transaction that is transmitted by a terminal;

determining, by the one or more processors, eligibility of the transaction for payment via a bank account;

when the transaction is eligible for payment via the bank account:

generating a first unique transaction identifier by the one or more processors and providing, by the one or more processors, an electronic authorization response that is transmitted to the terminal, the authorization response including the first unique transaction identifier;

storing, by the one or more processors, data associated with the electronic authorization response in an authorization response file;

receiving, by the one or more processors, an electronic response packet that is transmitted by the terminal, the response packet including a second unique transaction identifier comprising at least the first unique transaction identifier, and a transaction decision regarding whether or not the check transaction is to proceed with payment via the bank account; and storing, by the one or more processors, data associated with the electronic response packet in a response packet file;

comparing, by the one or more processors, the response packet file with the authorization response file prior to settling the transaction; and settling, by the one or more processors, the transaction when data in the response packet file matches data in the authorization response file.

2. The method of claim 1 wherein the first and second transaction identifiers include a number.

3. The method of claim 1 wherein the first and second transaction identifiers include a letter.

4. The method of claim 1 wherein the first and second transaction identifiers include a symbol.

5. The method of claim 1 further comprising providing an electronic confirmation of receipt of the response packet that is transmitted to the terminal.

6. The method of claim 1 further comprising receiving a settlement request from the terminal or a merchant host, and settling the transaction in response to the settlement request.

7. The method of claim 6 wherein receiving a settlement request occurs simultaneously with receiving an electronic response packet.

8. The method of claim 6 wherein receiving a settlement request occurs after receiving an electronic response packet.

9. The method of claim 1 wherein determining eligibility includes determining eligibility based at least in part on rules associated with one of either an authorization host or a financial institution.

10. The method of claim 1 wherein determining eligibility includes determining if funds exist in the bank account.

11. A computer system to process a check transaction initiated by a terminal, the computer system comprising:

a memory that stores computer-executable instructions;

a processor in communication with the memory, wherein the processor is configured to execute the computer executable instructions to:

receive transaction information associated with a check transaction that is transmitted by a terminal;

determine eligibility of the check transaction for payment via a bank account;

when the transaction is eligible for payment via the bank account:

generate a first unique transaction identifier;
provide an electronic authorization response that is communicated to the terminal, the authorization response including the first unique transaction identifier;
store data associated with the electronic authorization response in an authorization response file;
receive an electronic response packet provided by the terminal, the response packet including a second unique transaction identifier comprising at least the first unique transaction identifier, and a transaction decision regarding whether or not the check transaction is to proceed with payment via the bank account; and
store data associated with the electronic response packet in a response packet file;
compare the response packet file with the authorization response file prior to settling the transaction; and
settle the transaction when data in the electronic response packet matches data in the authorization response file.

12. The computer system of claim 11, wherein the computer-executable instructions are further operable to provide an electronic confirmation of receipt of the response packet to the terminal.

13. The computer system of claim 11 wherein the computer-executable instructions are further operable to determine eligibility based on rules of one of an authorization host and a financial institution.

14. The computer system of claim 11 wherein the computer-executable instructions to determine eligibility include instructions for determining if funds exist in the bank account.

15. A computer-implemented method for processing a check transaction, the method comprising:
receiving, by one or more processors, transaction information associated with the check transaction that is transmitted by a terminal;
determining, by the one or more processors, eligibility of the transaction for payment via a bank account, wherein determining eligibility is based at least in part on rules provided by either an authorization host or a financial institution;
when the transaction is eligible for payment via the bank account:
generating a first unique transaction identifier by the one or more processors and providing, by the one or more processors, an electronic authorization response that is transmitted to the terminal, the authorization response including the first unique transaction identifier;
storing, by the one or more processors, data associated with the electronic authorization response in an authorization response file;
receiving, by the one or more processors, an electronic response packet that is transmitted by the terminal, the response packet including a second unique transaction identifier comprising at least the first unique transaction identifier, and a transaction decision regarding whether or not the check transaction is to proceed with payment via the bank account;
storing, by the one or more processors, data associated with the electronic response packet in a response packet file; and
receiving, by the one or more processors, a settlement request from the terminal or a merchant host;
comparing, by the one or more processors, the response packet file with the authorization response file prior to settling the transaction; and
settling, by the one or more processors, the transaction in response to the settlement request when data in the response packet file matches data in the authorization response file.

16. A computer-implemented method for processing a check transaction, the method comprising:
receiving by one or more processors, transaction information associated with the check transaction that is transmitted by a terminal;
determining, by the one or more processors, eligibility of the transaction for payment via a bank account;
upon determining the transaction is eligible for payment via the bank account;
generating a first unique transaction identifier by the one or more processors and providing, by the one or more processors, an electronic authorization response that is transmitted to the terminal, the authorization response including the first unique transaction identifier;
storing, by the one or more processors, data associated with the electronic authorization response in an authorization response file;
receiving, by the one or more processors, an electronic response packet that is transmitted by the terminal, the response packet including a second unique transaction identifier comprising at least the first unique transaction identifier, and a transaction decision regarding whether or not the check transaction is to proceed with payment via the bank account; and
storing, by the one or more processors, data associated with the electronic response packet in a response packet file;
comparing, by the one or more processors, the response packet file with the authorization response file prior to settling the transaction; and
settling, by the one or more processors, the transaction when data in the response packet file matches data in the authorization response file.

17. A computer-implemented method for processing a check transaction, the method comprising:
receiving, by one or more processors, transaction information associated with the check transaction that is transmitted by a terminal;
determining, by the one or more processors, eligibility of the transaction for payment via a bank account, wherein determining eligibility is based at least in part on rules provided by either an authorization host or a financial institution;
upon determining the transaction is eligible for payment via the bank account;
generating a first unique transaction identifier by the one or more processors and providing, by the one or more processors, an electronic authorization response that is transmitted to the terminal, the authorization response including the first unique transaction identifier;
storing, by the one or more processors, data associated with the electronic authorization response in an authorization response file;
receiving, by the one or more processors, an electronic response packet that is transmitted by the terminal, the response packet including a second unique transaction identifier comprising at least the first unique transaction identifier, and a transaction decision regarding whether or not the check transaction is to proceed with payment via the bank account; and storing, by the one or more processors, data associated with the electronic response packet in a response packet file;

comparing, by the one or more processors, the response packet file with the authorization response file prior to settling the transaction;

receiving, by the one or more processors, a settlement request from the terminal or a merchant host; and settling, by the one or more processors, the transaction in response to the settlement request from the terminal or a merchant host when data in the response packet file matches data in the authorization response file.

* * * * *

UNITED STATES PATENT AND TRADEMARK OFFICE
CERTIFICATE OF CORRECTION

PATENT NO. : 7,599,888 B2
APPLICATION NO. : 09/992596
DATED : October 6, 2009
INVENTOR(S) : Manfre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1720 days.

Signed and Sealed this

Twenty-eighth Day of September, 2010

David J. Kappos
*Director of the United States Patent and Trademark Office*